UNITED STATES PATENT OFFICE.

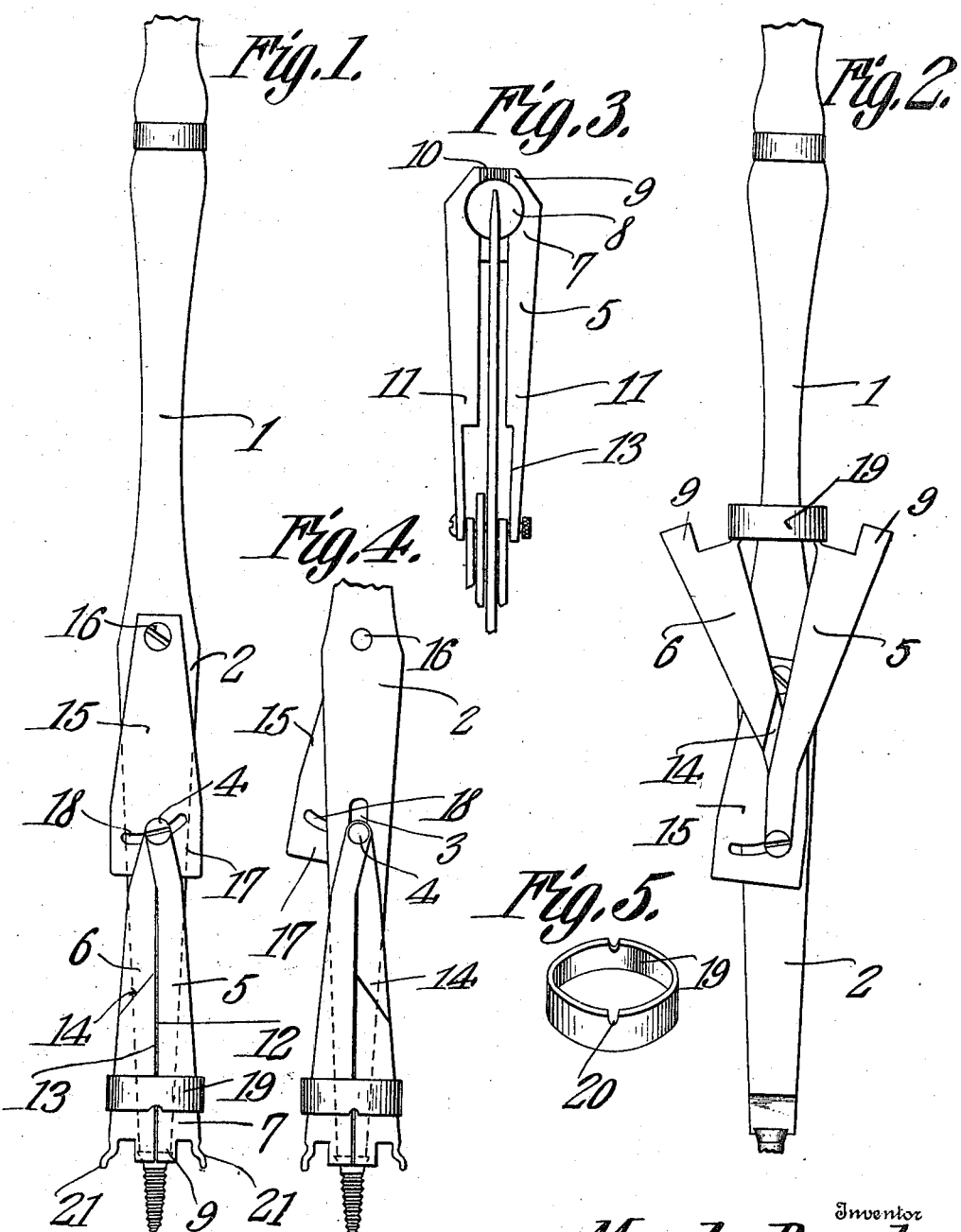

MOODY BOYD, OF LOUISVILLE, KENTUCKY.

SCREW-DRIVER.

963,204.  Specification of Letters Patent.  Patented July 5, 1910.

Application filed June 19, 1909. Serial No. 503,193.

*To all whom it may concern:*

Be it known that I, MOODY BOYD, a citizen of the United States, residing at Louisville, in the county of Jefferson and State of Kentucky, have invented a new and useful Screw-Driver, of which the following is a specification.

My invention relates to screw drivers and has for an object to provide a device of this character which will securely clamp the head of the screw and hold the same against independent rotation until the screw is sunk nearly to the head.

Another object is to provide a device of this character which will have oppositely arranged movable clamping jaws that will be adjustable to retain screw heads varying in thicknesses.

A further object is to provide a device of this character in which the jaws may be rocked back against the lateral edges of the screw driver and held clamped in this position in order to sink the projecting head of the screw flush with the surface of the wood.

With these advantages and other objects in view which will appear as the nature of the invention is better understood, my invention embraces the structure illustrated in the accompanying drawing, shown in the following specification and pointed out in the appended claim.

In the accompanying drawing, Figure 1 is a side elevation of the screw driver constructed in accordance with my invention. Fig. 2 is a similar view of the screw driver, showing the jaws rocked back in raised or released position. Fig. 3 is a detail view of one of the jaws showing the concave working face with a portion of the screw driver in end elevation. Fig. 4 is a rear elevation of the screw driver. Fig. 5 is a detail view of the non-flexible ring.

In a more detailed description of my invention in which like characters of reference designate similar parts wherever they occur in the views shown, 1 designates a screw driver having a tapered shank 2 terminating in the usual working edge. Formed in the shank 2 is a longitudinal slot 3 through which a pivot pin 4 is passed to pivotally engage the movable jaws 5 and 6.

The movable jaws 5 and 6 are tapering in contour, the lower portion of each jaw being considerably thickened to form a working head 7 having a concave working face 8 adapted to receive the beveled head of a screw. Each head is provided with an extension 9 substantially semi-circular in cross section and having a slot 10 in its flat face leading to the concave working face 8 of the head. The slots 10 coöperate to engage the shank of a screw when the jaws are closed and are provided with longitudinal serrations adapted to engage the shank of the screw and prevent the independent rotation of the screw in the jaws. Each jaw terminates at the end opposite its working head in spaced arms 11 adapted to permit the screw driven shank 2 to project therebetween, as shown in Fig. 3, so that the opposed faces 12 of the jaws may be held in contact throughout their entire length. The arms 11 of each jaw are provided terminally with suitable bearing to receive the extremities of the pivot pin 4. The pivot pin is adapted to be slided lengthwise in the slot 3 formed in the shank of the screw driver so that the jaws may be slided longitudinally of the screw driver shank whereby to permit screw heads of various thicknesses to be inserted between the working edge of the screw driver and adjacent edges of the slots 10. The jaws being pivotally connected together through the instrumentality of the pin 4 may be rocked open until their working heads come into contact with the shank of the screw driver, as shown in Fig. 2. The object of this is to permit a screw head to be sunk flush with the surface of the wood after the screw has been advanced until its farther advancement is prevented by the extensions 9 coming into contact with the wood. The spaced arms 11 of the jaw 5 are undercut, as shown at 13, on their opposed inner surfaces and the spaced arms of the jaws 6 are undercut on their outer surfaces, as shown at 14, the object of this being to permit the undercut portions of the arms of one of the jaws to slide over the undercut portions of the arms of the other jaw to facilitate of the jaws being raised to their released position, as shown in Fig. 2.

In order to slide the clamping jaws longitudinally of the shank of the screw driver so that screw heads of various thicknesses may be effectively engaged a shifting plate 15 is provided. The shifting plate is pivotally connected at one end to the shank of the screw driver by a pivot pin or similar connecting means 16. The other end 17 of the shifting plate is expanded and provided with an arcuate cam slot 18 adapted to slidingly fit the shank of the pivot pin 4. The arcuate slot is non-concentric with the pivot of the shifting plate so that as the shifting plate is rocked upon the shank 2 of the screw driver, the cam slot will advance or retract the pivot pin 4 in the slot 3 whereby the jaws are correspondingly moved longitudinally of the screw driver. The non-concentric slot gives a wider range of movement to the pivot pin than a concentric cam slot. The jaws may be thus adjusted to receive screw heads of various thicknesses by a simple rocking movement of the shifting plate, this actuation of the shifting plate taking place after the jaws have been closed upon the screw head.

Fitted over the jaws is a non-flexible ring 19 disposed to slide longitudinally of the jaws, the thickened portions of the latter constituting means for limiting the movement of the ring. The ring encircles the jaws when in operative position and tightly clamps the same together. This ring is sufficient in size to slide over the lateral edges of the shifting plate 15 and engage the clamping jaws when they are in their raised or released position and hold the same in this position. To promote the effective operation of the ring in locking the jaws in released position, a pair of notches 20 are formed in the periphery of the ring diametrically opposite each other and a pair of upstanding projections 21 are formed on the clamping jaws adapted to engage the notches. Each of the projections 21 is offset intermediate its ends, the offset portions forming shoulders which engage the notches and the free extremities of the projections forming fingers to bear against the inner face of the ring and securely hold the latter seated on the shoulders of the projections.

What is claimed is:—

In combination with a screw driver having a longitudinally disposed slot, a pin located in said slot, jaws pivoted upon said pin and a plate pivoted upon the screw driver and having a cam slot which receives the said pin.

In testimony that I claim the foregoing as my own, I have hereto affixed my signature in the presence of two witnesses.

MOODY BOYD.

Witnesses:
J. W. JOHNSTON,
NELLIE F. BOYD.